United States Patent [19]
Hasenpusch et al.

[11] Patent Number: 5,460,643
[45] Date of Patent: Oct. 24, 1995

[54] METHOD OF REGENERATING MERCURY ADSORPTION MEANS

[75] Inventors: Wolfgang Hasenpusch, Hanau; Harald Wetterich, Hoesbach, both of Germany

[73] Assignee: Degussa Aktiengesellschaft, Frankfurt am Main, Germany

[21] Appl. No.: 186,517

[22] Filed: Jan. 26, 1994

[30] Foreign Application Priority Data

Jan. 27, 1993 [DE] Germany .............. 43 02 166.2

[51] Int. Cl.$^6$ .................... B01D 53/04
[52] U.S. Cl. .................... 95/134; 95/148; 502/27; 502/56
[58] Field of Search .......... 95/110, 134; 423/210; 502/27, 56

[56] References Cited

U.S. PATENT DOCUMENTS

| | | | |
|---|---|---|---|
| 3,257,776 | 6/1966 | Park et al. ................. | 95/134 |
| 3,814,799 | 6/1974 | Wygasch ................... | 423/210 |
| 3,888,124 | 6/1975 | Campbell et al. .......... | 95/134 X |
| 4,530,910 | 7/1985 | Mross et al. .............. | 502/27 X |
| 4,591,490 | 5/1986 | Horton ..................... | 95/134 X |
| 4,892,567 | 1/1990 | Yan ........................ | 95/134 X |
| 5,110,480 | 5/1992 | Yan ........................ | 210/670 |
| 5,173,286 | 12/1992 | Audeh ..................... | 423/210 X |
| 5,209,773 | 5/1993 | Audhe et al. ............. | 423/210 X |
| 5,281,258 | 1/1994 | Markovs ................... | 95/134 X |
| 5,281,259 | 1/1994 | Markovs ................... | 95/134 |
| 5,322,628 | 6/1994 | Yan ........................ | 95/134 X |

FOREIGN PATENT DOCUMENTS

| | | |
|---|---|---|
| 393632 | 11/1991 | Austria . |
| 0487834 | 6/1992 | European Pat. Off. . |
| 3729030 | 3/1989 | Germany . |
| 4116890 | 11/1991 | Germany . |
| 1376544 | 12/1974 | United Kingdom . |

OTHER PUBLICATIONS

European Search Report dated May 27, 1994 of EP 92 12 0577.

Primary Examiner—Robert Spitzer
Attorney, Agent, or Firm—Beveridge, DeGrandi, Weilacher & Young

[57] ABSTRACT

Ceramic particles impregnated with silver nitrate for adsorbing mercury from waste gases can be regenerated and reused if the mercury is distilled off at 600° to 900° C. and the ceramic particles are subsequently impregnated with nitric acid.

6 Claims, 1 Drawing Sheet

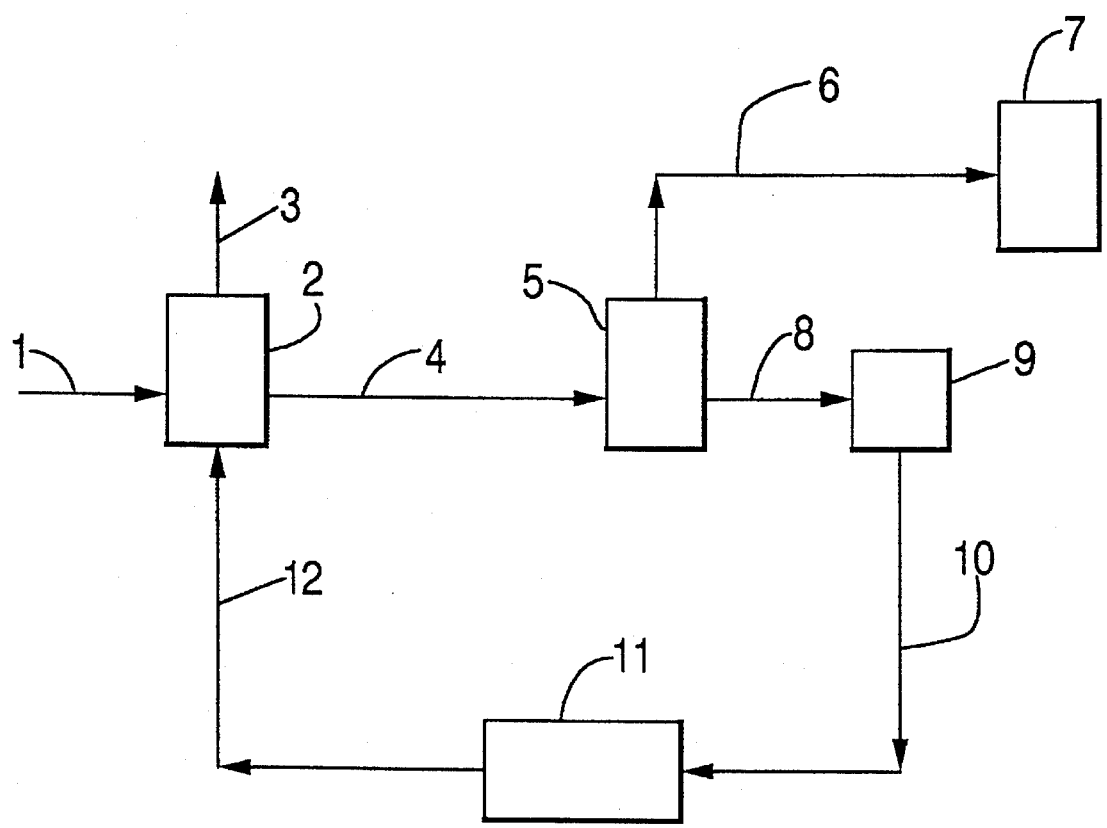

METHOD OF REGENERATING MERCURY ADSORPTION MEANS

INTRODUCTION AND BACKGROUND

The present invention relates to a method for regenerating silver nitrate impregnated ceramic particles for removing mercury from waste exhaust gases.

In the past a number of methods have been developed for separating gaseous mercury from waste gases which usually used impregnated ceramic particles capable of adsorbing the mercury. Such methods can lower the concentration of mercury in the waste gas to a few µg/m$^3$. However, the disadvantage of these past methods resides in the fact that these particles must usually be stored in special sanitary landfills after having been charged with mercury. In addition to taking up landfill space, which is in short supply in any case, there is also the danger that the mercury can leach out into the ground water.

AT patent 393,632 teaches a method of separating mercury from waste gases during the burning of waste containing heavy metals in which method zeolite particles impregnated with silver salts are used. Limit values of less than 50 µg mercury per cubic meter waste gas can be achieved thereby. The impregnation of the zeolite particles with silver salts takes place in a simple manner by spraying with waste water obtained from the film and photo industry.

The zeolite particles containing the absorbed heavy metals and mercury are subsequently used to manufacture bricks and clinkers. Recovery of the mercury and of the silver from the zeolite is not provided and the processing of the contaminated zeolite to form bricks and clinkers is very problematic for environmental reasons.

It is an object of the present invention to provide a method for regenerating silver nitrate impregnated ceramic particles used for the removal of mercury from waste gases in which method the mercury is recovered and the ceramic particles can be reused for the adsorption of mercury.

SUMMARY OF THE INVENTION

In achieving the above and other objects, one feature of the invention resides in a process where the ceramic particles containing the adsorbed mercury are heated to 600° to 900° C. in order to expel the mercury and subsequently impregnating the ceramic particles with nitric acid and thereafter drying the particles.

Hydrogen peroxide is preferably added to the nitric acid before the impregnation. This prevents the formation of gases containing nitrogen oxides.

BRIEF DESCRIPTION OF DRAWING

The present invention will be further understood with reference to the FIG. which is a schematic flow diagram of the overall process of the invention.

DETAILED DESCRIPTION OF INVENTION

A variety of ceramic particles can be used for purposes of the present invention, such as silica gels, silicas or zeolites. They are provided with 2 to 20% by weight silver nitrate by impregnating the particles with a concentrated aqueous silver nitrate solution and subsequently drying them. Silver nitrate contents of 10 to 15% by weight have proven themselves to be particularly useful. These particles are superbly suited for adsorbing mercury vapors from waste gases.

With reference to the accompanying drawing, waste gas containing mercury contamination is conveyed through pipe (1) to adsorption tower (2) which is filled with the ceramic particles impregnated with silver nitrate. Treated gas leaves the system through line 3. The mercury contaminated particles are then conveyed (4) to distillation tower (5) for heating.

When the mercury adsorption by the particles is complete, the ceramic particles are regenerated by heating them in order to distil off the mercury at temperatures of 600° to 900° C., especially to 850° to 900° C. These temperatures are far above the boiling temperature of mercury (356° C.). After the mercury has been completely distilled off the ceramic particles are conveyed (8) to a vessel (9) where they are cooled down and contacted with nitric acid, at which time the silver formed during the heating operation turns back into silver nitrate. The treated ceramic particles are then conveyed (10) to a dryer 11. After the drying, the regenerated ceramic particles can be recycled (12) to be reused for adsorbing mercury from waste gases in tower 2.

The distilled mercury is conveyed (6) to a water cooled condenser (7) of conventional design and then is condensed. It can be precipitated on copper surfaces to form an amalgam.

For purposes of the invention, conventional ceramics can be used which are readily available commercially. Any suitable zeolite can be used.

Possibilities for using the present invention are to be found in the industrial area, the detoxification of waste process gasses and waste combustion gasses and also in the burning of mercury-containing waste and clarification sludges in community sewage treatment plants and incinerating plants.

The ceramic particles of the present invention can also be used in vacuum removal systems in the workplace such as e.g. in chemical laboratories, dental labs and dental practices. In these situations readily replaceable filter cartridges could be integrated into the exhaust flow.

The distillation equipment suitable for large scale commercial purposes would have a capacity of several hundred liters and advantageously could be fabricated of glass. It is advantageous to use electrical heating although a heating gas can also be used.

It is possible, when cleaning up soil contaminated with mercury, to remove the mercury from the ground with compressed air, purify the compressed air with filter systems and work up the filter material without creating a new problem with Hg-contaminated waste substances.

In carrying out the invention, dilute or concentrated nitric acid can be used. The nitric acid can be sprayed onto the particles, on the particles can be immersed in the nitric acid.

The following example is intended to explain the method of the invention in detail:

50 g of a silica gel coated with 15% by weight silver nitrate (7.5 g AgNO$_3$/50 g adsorbent) are filled between two cotton plugs into a gas-washing bottle in such a manner that a mercury-containing current of air can flow through the entire adsorbent.

A washing bottle filled with mercury is heated in a water bath to 80° C. and a current of air of 90 l/h is conducted at a constant temperature through the adsorption means to the measuring device. After leaving the mercury-filled washing bottle, the current of air contains 830 mg Hg/cm$^3$ air. The following concentrations of mercury are determined in the current of air leaving the gas washing bottle with the adsorption means as a function of the time:

| Measured values: | | | |
|---|---|---|---|
| Hours | μg Hg/m³ | Hours | μm Hg/m³ |
|  |  | 47 | 12 |
| 2 | 5 | 48 | 30 |
| 5 | 6 | 49 | 48 |
| 20 | 6 | 50 | 70 |
| 44 | 7 | 51 | 192 |
| 46 | 9 | 52 | 432 |

The measuring of mercury takes place with an atomic absorption double-beam photometer.

The adsorption material changes its color during the adsorption procedure from white to grey/black and adsorbs 6.7 g (approximately 13% by weight) mercury.

The silica gel containing the adsorbed mercury is subsequently heated to approximately 850° C. and the mercury distilled off. A brown/black silica-gel carrier coated with silver remains which is treated after having cooled off with a slight excess (relative to silver) of nitric acid. The silver is converted back into silver nitrate thereby, during which the formation of nitrogen oxide gases can be suppressed by cautiously adding a little hydrogen peroxide. After drying at 120°–130° C., the adsorbent is filled into a gas-washing bottle again and the test procedure described above is repeated.

| Measured results: | | | |
|---|---|---|---|
| Hours | μg Hg/m³ | Hours | μm Hg/m³ |
|  |  | 40 | 345 |
| 2 | 320 | 41 | 347 |
| 5 | 353 | 42 | 530 |
| 20 | 342 | 43 | 900 |
| 39 | 348 |  |  |

The results show that the adsorption material has lost some adsorption capacity but is comparable in its operating life to the initial product.

Further variations and modifications of the herein described invention will be apparent to those skilled in the art and are intended to be encompassed by the claims appended hereto.

German priority application P 43 02 166.2 is relied on and incorporated herein by reference.

We claim:

1. A method for regenerating ceramic particles impregnated with silver nitrate used for the removal of mercury from waste gases, comprising heating ceramic particles containing adsorbed mercury to 600° to 900° C. in order to distill and remove the mercury from said particles prior to treatment with nitric acid, recovering the ceramic particles and subsequently impregnating said particles which are free of mercury with nitric acid.

2. The method according to claim 1 further comprising drying said particles.

3. The method according to claim 1, wherein the particles are heated to 850° to 900° C.

4. The method according to claim 1 further comprising adding hydrogen peroxide to the nitric acid.

5. The method according to claim 1 wherein said ceramic particle are selected from the group consisting of silica gels, silica and zeolites.

6. The method according to claim 1 further comprising cooling said particle after heating to 600° to 900° C.

* * * * *